(12) United States Patent (10) Patent No.: US 7,721,999 B2
Voogt (45) Date of Patent: May 25, 2010

(54) AEROSPACE VEHICLE FAIRING SYSTEMS AND ASSOCIATED METHODS

(75) Inventor: Nicolaas Voogt, Bothell, WA (US)

(73) Assignee: The Boeing Company, Chicago, IL (US)

( * ) Notice: Subject to any disclaimer, the term of this patent is extended or adjusted under 35 U.S.C. 154(b) by 346 days.

(21) Appl. No.: 11/758,210

(22) Filed: Jun. 5, 2007

(65) Prior Publication Data

US 2008/0001036 A1 Jan. 3, 2008

Related U.S. Application Data

(63) Continuation-in-part of application No. 11/134,019, filed on May 20, 2005, now Pat. No. 7,300,021.

(51) Int. Cl.
 *B64C 3/38* (2006.01)
(52) U.S. Cl. .................................................... 244/213
(58) Field of Classification Search ................ 244/213, 244/214, 215, 216
 See application file for complete search history.

(56) References Cited

U.S. PATENT DOCUMENTS

| | | |
|---|---|---|
| 1,724,456 A | 8/1929 | Crook |
| 1,770,575 A | 7/1930 | Ksoll |
| 2,086,085 A | 7/1937 | Lachmann et al. |
| 2,169,416 A | 8/1939 | Griswold |
| 2,282,516 A | 5/1942 | Hans et al. |
| 2,289,704 A | 7/1942 | Grant |
| 2,319,383 A | 5/1943 | Zap |
| 2,347,230 A | 4/1944 | Zuck |
| 2,358,985 A | 9/1944 | McAndrew |
| 2,378,528 A | 6/1945 | Arsandaux |
| 2,383,102 A | 8/1945 | Zap |
| 2,385,351 A | 9/1945 | Davidsen |

(Continued)

FOREIGN PATENT DOCUMENTS

DE 387 833 1/1924

(Continued)

OTHER PUBLICATIONS

"Adaptive Aircraft: No Flight of Fancy?: Research into Using Exotic Means of Making Wings Change Shape In-Flight Looks Promising, Though Still a Long Way From Reality," Business Week On-Line, Jan. 7, 2003, pp. 1-3.

(Continued)

*Primary Examiner*—Tien Dinh
(74) *Attorney, Agent, or Firm*—Perkins Coie LLP

(57) ABSTRACT

Aerospace vehicle fairing systems and associated methods, including fairings that house flap surface drive mechanisms on aircraft, are disclosed herein. A method in accordance with one embodiment, for example, can include adjusting lift distribution across an airfoil. The airfoil includes a first inboard portion and a second outboard portion. The method can include locating a point of maximum curvature of a first fairing at least approximately forward of a trailing edge of the airfoil proximate to the first inboard portion. The method can also include locating a point of maximum curvature of a second fairing at least approximately aft of a trailing edge of the airfoil proximate to the second outboard portion. The locations of the points of maximum curvature for the first and second fairings are based, at least in part, on a target lift distribution.

5 Claims, 8 Drawing Sheets

U.S. PATENT DOCUMENTS

| | | |
|---|---|---|
| 2,387,492 A | 10/1945 | Blaylock et al. |
| 2,389,274 A | 11/1945 | Pearsall et al. |
| 2,406,475 A | 8/1946 | Rogers |
| 2,422,296 A | 6/1947 | Flader et al. |
| 2,444,293 A | 6/1948 | Holt |
| 2,458,900 A | 1/1949 | Erny |
| 2,504,684 A | 4/1950 | Harper |
| 2,518,854 A | 8/1950 | Badenoch |
| 2,563,453 A | 8/1951 | Briend |
| 2,652,812 A | 9/1953 | Fenzl |
| 2,665,084 A | 1/1954 | Feeney et al. |
| 2,851,229 A | 9/1958 | Clark |
| 2,864,239 A | 12/1958 | Taylor |
| 2,877,968 A | 3/1959 | Granan et al. |
| 2,886,008 A | 5/1959 | Geyer et al. |
| 2,891,740 A | 6/1959 | Campbell |
| 2,892,312 A | 6/1959 | James et al. |
| 2,899,152 A | 8/1959 | Weiland |
| 2,912,190 A | 11/1959 | MacDonough |
| 2,920,844 A | 1/1960 | Marshall et al. |
| 2,938,680 A | 5/1960 | Greene et al. |
| 2,990,144 A | 6/1961 | Hougland |
| 2,990,145 A | 6/1961 | Hougland |
| 3,013,748 A | 12/1961 | Westburg |
| 3,089,666 A | 5/1963 | Quenzler |
| 3,102,607 A | 9/1963 | Roberts |
| 3,112,089 A | 11/1963 | Dornier |
| 3,136,504 A | 6/1964 | Carr |
| 3,166,271 A | 1/1965 | Zuck |
| 3,203,275 A | 8/1965 | Hoover |
| 3,203,647 A | 8/1965 | Alvarez-Calderon |
| 3,282,535 A | 11/1966 | Steiner |
| 3,375,998 A | 4/1968 | Alvarez-Calderon |
| 3,423,858 A | 1/1969 | Speno |
| 3,447,763 A | 6/1969 | Allcock |
| 3,463,418 A | 8/1969 | Miksch |
| 3,499,622 A | 3/1970 | Lugan et al. |
| 3,504,870 A | 4/1970 | Cole et al. |
| 3,528,632 A | 9/1970 | Miles et al. |
| 3,539,133 A | 11/1970 | Robertson |
| 3,556,439 A | 1/1971 | Autry et al. |
| 3,587,311 A | 6/1971 | Hays, Jr. |
| 3,589,648 A | 6/1971 | Gorham et al. |
| 3,642,234 A | 2/1972 | Kamber et al. |
| 3,653,611 A | 4/1972 | Trupp et al. |
| 3,655,149 A | 4/1972 | Williams |
| 3,659,810 A | 5/1972 | Robertson |
| 3,677,504 A | 7/1972 | Schwarzler |
| 3,704,828 A | 12/1972 | Studer et al. |
| 3,704,843 A | 12/1972 | Jenny |
| 3,711,039 A | 1/1973 | James |
| 3,730,459 A | 5/1973 | Zuck |
| 3,743,219 A | 7/1973 | Gorges |
| 3,767,140 A | 10/1973 | Johnson |
| 3,794,276 A | 2/1974 | Maltby et al. |
| 3,804,267 A | 4/1974 | Cook et al. |
| 3,807,447 A | 4/1974 | Masuda |
| 3,813,062 A | 5/1974 | Prather |
| 3,827,658 A | 8/1974 | Hallworth |
| 3,831,886 A | 8/1974 | Burdges et al. |
| 3,836,099 A | 9/1974 | O'Neill et al. |
| 3,837,601 A | 9/1974 | Cole |
| 3,862,730 A | 1/1975 | Heiney |
| 3,874,617 A | 4/1975 | Johnson |
| 3,897,029 A | 7/1975 | Calderon |
| 3,904,152 A | 9/1975 | Hill |
| 3,910,530 A | 10/1975 | James et al. |
| 3,913,450 A | 10/1975 | MacGregir |
| 3,917,192 A | 11/1975 | Alvarez-Calderon |
| 3,931,374 A | 1/1976 | Moutet nee Layrisse et al. |
| 3,941,334 A | 3/1976 | Cole |
| 3,941,341 A | 3/1976 | Brogdon, Jr. |
| 3,949,957 A | 4/1976 | Portier et al. |
| 3,968,946 A | 7/1976 | Cole |
| 3,985,319 A | 10/1976 | Dean et al. |
| 3,987,983 A | 10/1976 | Cole |
| 3,991,574 A | 11/1976 | Frazier |
| 3,992,979 A | 11/1976 | Smith |
| 3,993,584 A | 11/1976 | Owen et al. |
| 3,994,451 A | 11/1976 | Cole |
| 4,011,888 A | 3/1977 | Whelchel et al. |
| 4,015,787 A | 4/1977 | Maieli et al. |
| 4,049,219 A | 9/1977 | Dean et al. |
| 4,106,730 A | 8/1978 | Spitzer et al. |
| 4,117,996 A | 10/1978 | Sherman |
| 4,120,470 A | 10/1978 | Whitener |
| 4,131,253 A | 12/1978 | Zapel |
| 4,146,200 A | 3/1979 | Borzachillo |
| 4,171,787 A | 10/1979 | Zapel |
| 4,172,575 A | 10/1979 | Cole |
| 4,180,222 A | 12/1979 | Thornburg |
| 4,181,275 A | 1/1980 | Moelter et al. |
| 4,189,120 A | 2/1980 | Wang |
| 4,189,121 A | 2/1980 | Harper et al. |
| 4,189,122 A | 2/1980 | Miller |
| 4,200,253 A | 4/1980 | Rowarth |
| 4,202,519 A | 5/1980 | Fletcher |
| 4,240,255 A | 12/1980 | Benilan |
| 4,248,395 A | 2/1981 | Cole |
| 4,262,868 A | 4/1981 | Dean |
| 4,267,990 A | 5/1981 | Staudacher et al. |
| 4,283,029 A | 8/1981 | Rudolph |
| 4,285,482 A | 8/1981 | Lewis |
| 4,293,110 A | 10/1981 | Middleton |
| 4,312,486 A | 1/1982 | McKinney |
| 4,351,502 A | 9/1982 | Statkus |
| 4,353,517 A | 10/1982 | Rudolph |
| 4,358,077 A | 11/1982 | Coronel |
| 4,360,176 A | 11/1982 | Brown |
| 4,363,098 A | 12/1982 | Buus et al. |
| 4,365,774 A | 12/1982 | Coronel |
| 4,368,937 A | 1/1983 | Palombo |
| 4,384,693 A | 5/1983 | Pauly et al. |
| 4,427,168 A | 1/1984 | McKinney |
| 4,441,675 A | 4/1984 | Boehringer |
| 4,444,368 A | 4/1984 | Andrews |
| 4,448,375 A | 5/1984 | Herndon |
| 4,459,084 A | 7/1984 | Clark |
| 4,461,449 A | 7/1984 | Turner |
| 4,469,687 A * | 9/1984 | Labarre et al. ............... 514/83 |
| 4,471,925 A | 9/1984 | Kunz et al. |
| 4,471,927 A | 9/1984 | Rudolph |
| 4,472,780 A | 9/1984 | Chenoweth et al. |
| 4,475,702 A | 10/1984 | Cole |
| 4,479,620 A | 10/1984 | Rogers et al. |
| 4,485,992 A | 12/1984 | Rao |
| 4,496,121 A | 1/1985 | Berlin |
| 4,498,646 A | 2/1985 | Proksch |
| 4,528,775 A | 7/1985 | Einarsson |
| 4,533,096 A | 8/1985 | Baker et al. |
| 4,542,869 A | 9/1985 | Brine |
| 4,544,117 A | 10/1985 | Schuster |
| 4,553,722 A | 11/1985 | Cole |
| 4,575,030 A | 3/1986 | Gratzer |
| 4,575,099 A | 3/1986 | Nash |
| 4,576,347 A | 3/1986 | Opsahl |
| 4,605,187 A | 8/1986 | Stephenson |
| 4,618,109 A | 10/1986 | Victor |
| 4,637,573 A | 1/1987 | Perin et al. |
| 4,650,140 A | 3/1987 | Cole |
| 4,669,687 A | 6/1987 | Rudolph |
| 4,691,879 A | 9/1987 | Greene |
| 4,700,911 A | 10/1987 | Zimmer |
| 4,702,441 A | 10/1987 | Wang |

| | | | | | | |
|---|---|---|---|---|---|---|
| 4,706,913 A | 11/1987 | Cole | | 6,152,405 A | 11/2000 | Muller et al. |
| 4,712,752 A | 12/1987 | Victor | | 6,161,801 A | 12/2000 | Kelm |
| 4,717,097 A | 1/1988 | Sepstrup | | 6,164,598 A | 12/2000 | Young et al. |
| 4,729,528 A | 3/1988 | Borzachillo | | 6,173,924 B1 | 1/2001 | Young et al. |
| 4,747,375 A | 5/1988 | Williams | | 6,189,837 B1 | 2/2001 | Matthews |
| 4,784,355 A | 11/1988 | Brine | | 6,213,433 B1 | 4/2001 | Gruensfelder |
| 4,786,013 A | 11/1988 | Pohl | | 6,227,498 B1 | 5/2001 | Arata |
| 4,789,119 A | 12/1988 | Bellego et al. | | 6,244,542 B1 | 6/2001 | Young et al. |
| 4,796,192 A | 1/1989 | Lewis | | 6,293,497 B1 | 9/2001 | Kelley-Wickemeyer et al. |
| 4,823,836 A | 4/1989 | Bachmann et al. | | 6,328,265 B1 | 12/2001 | Dizdarevic |
| 4,838,503 A | 6/1989 | Williams et al. | | 6,349,798 B1 | 2/2002 | McKay |
| 4,854,528 A | 8/1989 | Hofrichter et al. | | 6,349,903 B2 | 2/2002 | Caton et al. |
| 4,856,735 A | 8/1989 | Lotz et al. | | 6,364,254 B1 | 4/2002 | May |
| 4,867,394 A | 9/1989 | Patterson, Jr. et al. | | 6,375,126 B1 | 4/2002 | Sakurai |
| 4,892,274 A | 1/1990 | Pohl et al. | | 6,382,566 B1 | 5/2002 | Ferrel et al. |
| 4,899,284 A | 2/1990 | Lewis et al. | | 6,431,498 B1 | 8/2002 | Watts et al. |
| 4,962,902 A | 10/1990 | Fortes | | 6,439,512 B1 | 8/2002 | Hart |
| 5,039,032 A | 8/1991 | Rudolph | | 6,443,394 B1 | 9/2002 | Weisend |
| 5,046,688 A | 9/1991 | Woods | | 6,450,457 B1 | 9/2002 | Sharp |
| 5,050,081 A | 9/1991 | Abbott et al. | | 6,464,175 B2 | 10/2002 | Yada et al. |
| 5,056,741 A | 10/1991 | Bliesner et al. | | 6,466,141 B1 | 10/2002 | McKay et al. |
| 5,074,495 A | 12/1991 | Raymond | | 6,478,541 B1 | 11/2002 | Charles et al. |
| 5,082,207 A | 1/1992 | Tulinius | | 6,481,667 B1 | 11/2002 | Ho |
| 5,082,208 A | 1/1992 | Matich | | 6,484,969 B2 | 11/2002 | Sprenger |
| 5,088,665 A | 2/1992 | Vijgen | | 6,499,577 B2 | 12/2002 | Kitamoto et al. |
| 5,094,411 A | 3/1992 | Rao | | 6,536,714 B2 | 3/2003 | Gleine et al. |
| 5,094,412 A | 3/1992 | Narramore | | 6,547,183 B2 | 4/2003 | Farnsworth |
| 5,100,082 A | 3/1992 | Archung | | 6,554,229 B1 | 4/2003 | Lam |
| 5,114,100 A | 5/1992 | Rudolph | | 6,561,463 B1 | 5/2003 | Yount et al. |
| 5,129,597 A | 7/1992 | Manthey | | 6,591,169 B2 | 7/2003 | Jones |
| 5,158,252 A | 10/1992 | Sakurai | | 6,598,829 B2 | 7/2003 | Kamstra |
| 5,167,383 A | 12/1992 | Nozaki | | 6,598,834 B2 | 7/2003 | Nettle |
| 5,203,619 A | 4/1993 | Welsch | | 6,601,801 B1 | 8/2003 | Prow |
| 5,207,400 A | 5/1993 | Jennings | | 6,622,972 B2 | 9/2003 | Urnes, Sr. et al. |
| 5,244,269 A | 9/1993 | Harriehausen | | 6,622,974 B1 | 9/2003 | Dockter et al. |
| 5,259,293 A | 11/1993 | Brunner | | 6,625,982 B2 | 9/2003 | Van Den Bossche |
| 5,280,863 A | 1/1994 | Schmittle | | 6,644,599 B2 | 11/2003 | Perez |
| 5,282,591 A | 2/1994 | Walters et al. | | 6,651,930 B1 | 11/2003 | Gautier et al. |
| 5,351,914 A | 10/1994 | Nagao | | 6,729,583 B2 | 5/2004 | Milliere et al. |
| 5,388,788 A | 2/1995 | Rudolph | | 6,755,375 B2 | 6/2004 | Trikha |
| 5,441,218 A | 8/1995 | Mueller | | 6,796,526 B2 | 9/2004 | Boehringer |
| 5,474,265 A | 12/1995 | Capbern | | 6,796,534 B2 | 9/2004 | Beyer et al. |
| 5,493,497 A | 2/1996 | Buus | | 6,799,739 B1 | 10/2004 | Jones |
| 5,535,852 A | 7/1996 | Bishop | | 6,802,475 B2 | 10/2004 | Davies et al. |
| 5,542,684 A | 8/1996 | Squirrell | | 6,824,099 B1 | 11/2004 | Jones |
| 5,544,847 A | 8/1996 | Bliesner | | 6,843,452 B1 | 1/2005 | Vassberg et al. |
| 5,564,655 A | 10/1996 | Garland et al. | | 6,860,452 B2 | 3/2005 | Bacon et al. |
| 5,600,220 A | 2/1997 | Thoraval | | 6,870,490 B2 | 3/2005 | Sherry et al. |
| 5,609,020 A | 3/1997 | Jackson | | 6,978,971 B1 | 12/2005 | Dun |
| 5,680,124 A | 10/1997 | Bedell | | 6,981,676 B2 | 1/2006 | Milliere |
| 5,681,014 A | 10/1997 | Palmer | | 7,007,897 B2 | 3/2006 | Wingett et al. |
| 5,686,907 A | 11/1997 | Bedell | | 7,028,948 B2 | 4/2006 | Pitt |
| 5,735,485 A | 4/1998 | Ciprian et al. | | 7,048,228 B2 | 5/2006 | Vassberg et al. |
| 5,740,991 A | 4/1998 | Gleine et al. | | 7,048,234 B2 | 5/2006 | Recksiek et al. |
| 5,743,490 A | 4/1998 | Gillingham | | 7,048,235 B2 | 5/2006 | McLean et al. |
| 5,788,190 A | 8/1998 | Siers | | 7,051,982 B1 | 5/2006 | Johnson |
| 5,839,698 A | 11/1998 | Moppert | | 7,059,563 B2 | 6/2006 | Huynh |
| 5,875,998 A | 3/1999 | Gleine | | 7,300,021 B2 | 11/2007 | Voogt |
| 5,915,653 A | 6/1999 | Koppelman | | 7,475,854 B2 | 1/2009 | Lacy et al. |
| 5,921,506 A | 7/1999 | Appa | | 7,500,641 B2 | 3/2009 | Sakurai et al. |
| 5,927,656 A | 7/1999 | Hinkleman | | 2001/0006207 A1 | 7/2001 | Caton et al. |
| 5,934,615 A | 8/1999 | Treichler | | 2002/0046087 A1 | 4/2002 | Hey |
| 5,984,230 A | 11/1999 | Orazi | | 2002/0100842 A1 | 8/2002 | Perez |
| 6,015,117 A | 1/2000 | Broadbent | | 2003/0058134 A1 | 3/2003 | Sherry et al. |
| 6,033,180 A | 3/2000 | Machida et al. | | 2003/0132860 A1 | 7/2003 | Feyereisen |
| 6,045,204 A | 4/2000 | Frazier | | 2003/0197097 A1 | 10/2003 | Wakayama |
| 6,073,624 A | 6/2000 | Laurent | | 2003/0230677 A1 | 12/2003 | Milliere |
| 6,076,767 A | 6/2000 | Farley et al. | | 2004/0004162 A1 | 1/2004 | Beyer |
| 6,076,776 A | 6/2000 | Breitbach | | 2004/0059474 A1 | 3/2004 | Boorman |
| 6,079,672 A | 6/2000 | Lam et al. | | 2004/0195464 A1 | 10/2004 | Vassberg et al. |
| 6,082,679 A | 7/2000 | Crouch et al. | | 2004/0245386 A1 | 12/2004 | Huynh |
| 6,109,567 A | 8/2000 | Munoz | | 2005/0011994 A1 | 1/2005 | Sakurai et al. |
| 6,145,791 A | 11/2000 | Diller et al. | | 2005/0017126 A1 | 1/2005 | McLean et al. |

| | | | |
|---|---|---|---|
| 2005/0061922 A1 | 3/2005 | Milliere | |
| 2005/0109876 A1 | 5/2005 | Jones et al. | |
| 2005/0151028 A1 | 7/2005 | Pohl et al. | |
| 2005/0171652 A1 | 8/2005 | Speer et al. | |
| 2005/0224662 A1 | 10/2005 | Lacy et al. | |
| 2005/0242234 A1 | 11/2005 | Mahmulyin | |
| 2005/0274846 A1 | 12/2005 | Dun | |
| 2005/0274847 A1 | 12/2005 | Charron | |
| 2006/0000952 A1 | 1/2006 | Rampton et al. | |
| 2006/0038086 A1 | 2/2006 | Reckzeh | |
| 2006/0049308 A1 | 3/2006 | Good et al. | |
| 2006/0102803 A1 | 5/2006 | Wheaton et al. | |
| 2006/0169847 A1 | 8/2006 | Konings et al. | |
| 2006/0175468 A1 | 8/2006 | Huynh et al. | |
| 2007/0114328 A1 | 5/2007 | Lacy et al. | |
| 2008/0001036 A1 | 1/2008 | Voogt | |
| 2009/0146017 A1 | 6/2009 | Lacy et al. | |

FOREIGN PATENT DOCUMENTS

| | | |
|---|---|---|
| DE | 11 29 379 | 5/1962 |
| DE | 2 144 688 A | 3/1985 |
| EP | 0100775 A1 | 2/1984 |
| EP | 0 103 038 | 3/1984 |
| EP | 0215211 | 3/1987 |
| EP | 0216033 | 4/1987 |
| EP | 0 483 504 A1 | 5/1992 |
| EP | 0781704 A1 | 2/1997 |
| EP | 0 947 421 | 10/1999 |
| EP | 1 010 616 A2 | 6/2000 |
| EP | 1338506 | 8/2003 |
| EP | 1462361 | 9/2004 |
| EP | 1 547 917 A1 | 6/2005 |
| FR | 705155 | 6/1931 |
| FR | 984 443 | 7/1951 |
| FR | 56 121 | 9/1952 |
| FR | 57 988 | 9/1953 |
| FR | 58 273 | 11/1953 |
| FR | 2756540 | 6/1998 |
| GB | 1 181 991 | 2/1970 |
| GB | 2144688 | 3/1985 |
| WO | WO-2008051286 | 5/2008 |

OTHER PUBLICATIONS

"Aero-Space Research & Technology," Space Systems, Sep. 1, 2001, pp. 1-28.
"Flap (aircraft)", Wikipedia, The Free Encyclopedia, Aug. 3, 2006, 10:18 UTC. Wikimedia Foundation, Inc. Aug. 5, 2006; http://wn.wikipedia.org/index.pho?title=Flap_%28aircraft%29&oldid=67413665>.
"Slats.", Wikipedia, The Free Encyclopedia. Jun. 27, 2006, 12:323 UTC. Wikimedia Foundation, Inc. Aug. 5, 2006; http://wn.wikipedia.org/w/index.php?title=Slats&oldid=60827639>.
777 High Lift System, 777 Maintenance Manual, Publication Date: Circa 1994 (1 page).
777 Transmission—Typical, 777 Maintenance Manual, Publication Date: Circa 1994 (1 page).
A320 Hinterkantem-Klappen-Verstell System, Trailing Edge Flap System, SAE Presentation, Publication Date: Circa 1990 (1 page).
A340 Flight Controls, SAE Presentation, Publication Date: Circa 1995 (1 page).
Boeing, 777 Aircraft Maintenance Manual, Sep. 5, 2002 (p. 39).
Drela, M., "Optimization Techniques in Airfoil Design," MIT Aero & Astro, 29 pages.
Drela, Mark, "Design and Optimization Method for Multi-Element Airfoils," MIT Department of Aeronautics and Astronautics, Copyright 1993 American Institute of Aeronautics and Astronautics, Inc. (pp. 1-11).
Flap Drive System, 777 Maintenance Manual, Publication Date: Circa 1994 (1 page).
Flap Transmission and Support, 777 Maintenance Manual, Publication Date: Circa 1994 (1 page).
Hansen, H., "Application of Mini-Trailing-Edge Devices in the Awiator Project," Airbus Deutschland, EGAG, Hunefeldstr. 1-5, D-28199 Bremen, Germany, 9 pages.
Junkers JU 52/3M (2 pages); http://www.wpafb.af.mil/museum/outdoor/od16; [Accessed Aug. 7, 2003].
Leaf Spring Retainer Seals; EMP, Inc.; 2 pgs.
Moog, Component Maintenance Manual, May 1994 (2 pages).
Morphing Aircraft Structures, "Morphing Aircraft Structures-Raytheon," <<http://www.defense-update.com/products/m/morphing-structures.htm>>, pp. 1-3, [Accessed Aug. 31, 2005].
Morphing Aircraft Structures, "Morphing Aircraft Structures—The Cellular Approach," <http://www.personal.psu.edu/users/d/s/dsr134/mas/Cellular.htm>, Penn State University, pp. 1-3 [Accessed Aug. 31, 2005].
Morphing Systems, "Morphing Aerostructures—An Overview," <http://www.crgrp.net/morphingsystems.htm>, pp. 1-9, [Accessed Aug. 31, 2005].
Niu, Chen-Yen, Airframe Structural Design, Chen-Yeun Niu, Conmilit Press, 1988 (1 page).
Petrov, A.V., "Certain Types of Separated Flow over Slotted Wings," Fluid Mechanics—Soviet Research, vol. 7, No. 5, Sep.-Oct. 1978, pp. 80-89.
The High Speed Frontier, Chapter 2: The High-Speed Airfoil Program, "Supercritical" Airfoils, 1957-1978 (4 pages); http://www.hq.nasa.gov/office/pao/History/SP-445/ch2-5.
TU-144 Canard, 1 pg, (date unknown).
Tucker et al., "Enhanced Vertical Situation Display", filed Jun. 30, 2004, 11 pgs.
Whitcomb, Richard T., "Review of NASA Supercritical Airfoils," National Aeornautics and Space Administration, Aug. 1974 (pp. 8-18).
Rea, Jon, "Boeing 777 High Lift Control System," Boeing Commercial Airplane Group, IEEE AES Systems Magazine, Aug. 1993, pp. 15-21.
International Search Report and Written Opinion for Application No. PCT/US2008/064007, The Boeing Company, mailed Apr. 23, 2009, 14 pages.

* cited by examiner

US 7,721,999 B2

AEROSPACE VEHICLE FAIRING SYSTEMS AND ASSOCIATED METHODS

CROSS-REFERENCE TO RELATED APPLICATION

The present application is a continuation-in-part of pending U.S. patent application Ser. No. 11/134,019, filed May 20, 2005, and incorporated herein by reference in its entirety.

TECHNICAL FIELD

The present disclosure relates generally to aerospace vehicle fairing systems and associated methods, including fairings that house flap surface drive mechanisms on aircraft.

BACKGROUND

Modern high-speed aircraft generally have thin wings that provide a low drag profile during high-speed or cruise flight. The wings of these aircraft often include various movable surfaces to provide aircraft control and/or to configure the aircraft for low-speed operations (e.g., takeoff and landing). For example, in addition to carrying fuel, the wings of a high-speed transport aircraft typically included aileron surfaces, spoiler surfaces, leading edge device surfaces, and trailing edge flap surfaces. These movable surfaces are often located at or near the leading and trailing edges of the wing where the wing is too thin to fully enclose the support structure and/or drive mechanisms required to operate these surfaces. Accordingly, fairings are often mounted on the wing to house portions of the drive mechanisms and/or support structure that cannot be enclosed in the wing. These fairings are generally streamlined to have a low drag profile during high-speed or cruise flight.

FIG. 1 is a partially schematic illustration of a transport aircraft 50 having a fuselage 51 with a longitudinal axis L1, a first wing 10a, and a second wing 10b in accordance with the prior art. The first wing includes a movable flap surface 13a and a movable aileron surface 13b. A fairing 20 is mounted on the underside of the first wing 10a to house portions of a support structure and a drive mechanism that are required to operate the flap 13a. The fairing has a longitudinal axis L2 that is at least approximately parallel to the longitudinal axis L1 of the fuselage 51. The fairing 20 has a streamlined planform (e.g., when viewed from the top of the wing) where the widest part relative to the longitudinal axis L2 of the fairing is entirely forward of the trailing edge of the airfoil (e.g., entirely forward of the trailing edge of the flap 13a). However, even these fairings create drag on the aircraft.

SUMMARY

The present disclosure describes aerospace vehicle fairing systems and associated methods, including fairings that house flap surface drive mechanisms on aircraft. A method in accordance with one embodiment, for example, can include adjusting lift distribution across an airfoil. The airfoil includes a first inboard portion and a second outboard portion. The method can include locating a point of maximum curvature of a first fairing at least approximately forward of a trailing edge of the airfoil proximate to the first inboard portion. The method can also include locating a point of maximum curvature of a second fairing at least approximately aft of a trailing edge of the airfoil proximate to the second outboard portion. The locations of the points of maximum curvature for the first and second fairings are based, at least in part, on a target lift distribution.

Another aspect of the disclosure is directed to aircraft systems. One embodiment of an aircraft system, for example, can include an airfoil having a first inboard portion, a second outboard portion, and a trailing edge. The aircraft system also includes a first fairing mounted to the airfoil proximate to the first portion of the airfoil and a second fairing mounted to the airfoil proximate to the second portion of the airfoil. The first fairing has a point of maximum curvature at least approximately forward of the trailing edge, while the second fairing has a point of maximum curvature at least approximately aft of the trailing edge.

DETAILED DESCRIPTION

The present disclosure describes aerospace vehicle fairing systems and associated methods, including fairings that house flap surface drive mechanisms on aircraft. Several specific details are set forth in the following description and in FIGS. 2-10 to provide a thorough understanding of certain embodiments. One skilled in the art, however, will understand that the present invention may have additional embodiments, and that other embodiments may be practiced without several of the specific features described below.

Figure 2:
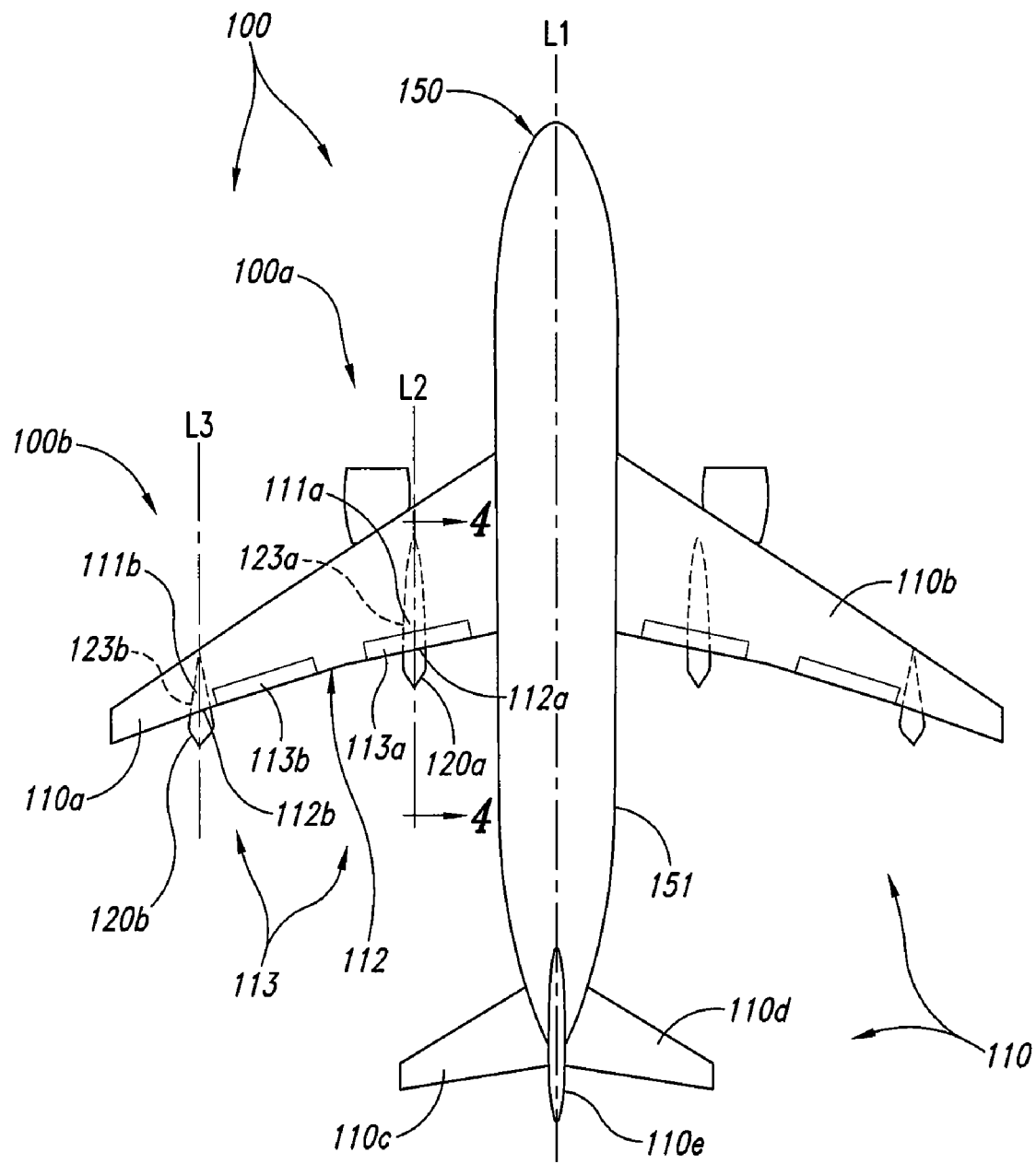
FIG. 2 is a partially schematic illustration of an aerospace vehicle with a first fairing system and a second fairing system configured in accordance with embodiments of the invention.

FIG. 2 illustrates an aerospace vehicle 150 having a first fairing system 100a and a second fairing system 100b configured in accordance with embodiments of the invention. In some embodiments the fairing systems 100a and 100b can reduce interference drag and/or increase lift over that of current fairings used on various aircraft. Features of the first fairing system 100a are discussed in further detail with reference to FIGS. 3-6. Features of the second fairing system 100b are discussed in further detail with reference to FIG. 7.

In the embodiment shown in FIG. 2, the aerospace vehicle 150 has a longitudinal axis L1 that runs through a fuselage 151 (e.g., through the forward tip and aft tip of the fuselage). The aerospace vehicle 150 also has multiple airfoils 110 coupled to the fuselage 151, including a first airfoil 110a (e.g., a left wing), a second airfoil 110b (e.g., a right wing), a third airfoil 110c (e.g., a left horizontal tail), a fourth airfoil 110d (e.g., a right horizontal tail), and a fifth airfoil 110e (e.g., a vertical stabilizer). In other embodiments, the aerospace vehicle 150 can have other arrangements including more or fewer fuselages 151, more or fewer airfoils 110, and/or other arrangements of airfoils 110 coupled to the aerospace vehicle and/or fuselage(s) 151.

In the illustrated embodiment, the first airfoil 110a includes a trailing edge 112 and two movable surfaces 113, shown as a first movable surface 113a configured as a flap surface and a second movable surface 113b configured as an aileron surface. In other embodiments, the first airfoil 110a can include more, fewer, or other types of movable surfaces 113. The first fairing system 100a can include a first fairing 120a having a longitudinal axis L2 that is at least approximately parallel to the longitudinal axis L1 of the aerospace vehicle 150. The first fairing 120a can be mounted to the first airfoil 110a so that a first section 111a of the first airfoil 110a corresponds to a planform projection of the first segment 123a of the first fairing 120a on the airfoil. The second fairing system 100b can include a second fairing 120b having a longitudinal axis L3 that is at least approximately parallel to the longitudinal axis of the aerospace vehicle 150. The second fairing 120b can also be mounted to the first airfoil 110a so that a second section 111b of the first airfoil 110a corresponds to a planform projection of the second segment 123b of the second fairing sections 120a on the airfoil. The first airfoil section 111a can include a first trailing edge portion 112a and the second airfoil section 111b can include a second trailing edge portion 112b.

In FIG. 2, the first airfoil section 111a includes a portion of the first movable surface 113a. The first movable surface 113a is located such that a portion of the trailing edge of the first movable surface 113a makes up at least a part of the first trailing edge portion 112a. Accordingly, at least a part of the first trailing edge portion 112a is movable between at least two positions (e.g., a retracted position and an extended position). In the illustrated embodiment, the first airfoil section 111a includes a first trailing edge portion 112a that moves as a single unit. In other embodiments, the first trailing edge portion can have other arrangements, including a first trailing edge portion 112a that has movable and fixed parts and/or multiple parts that move independently of one another.

Figure 3:
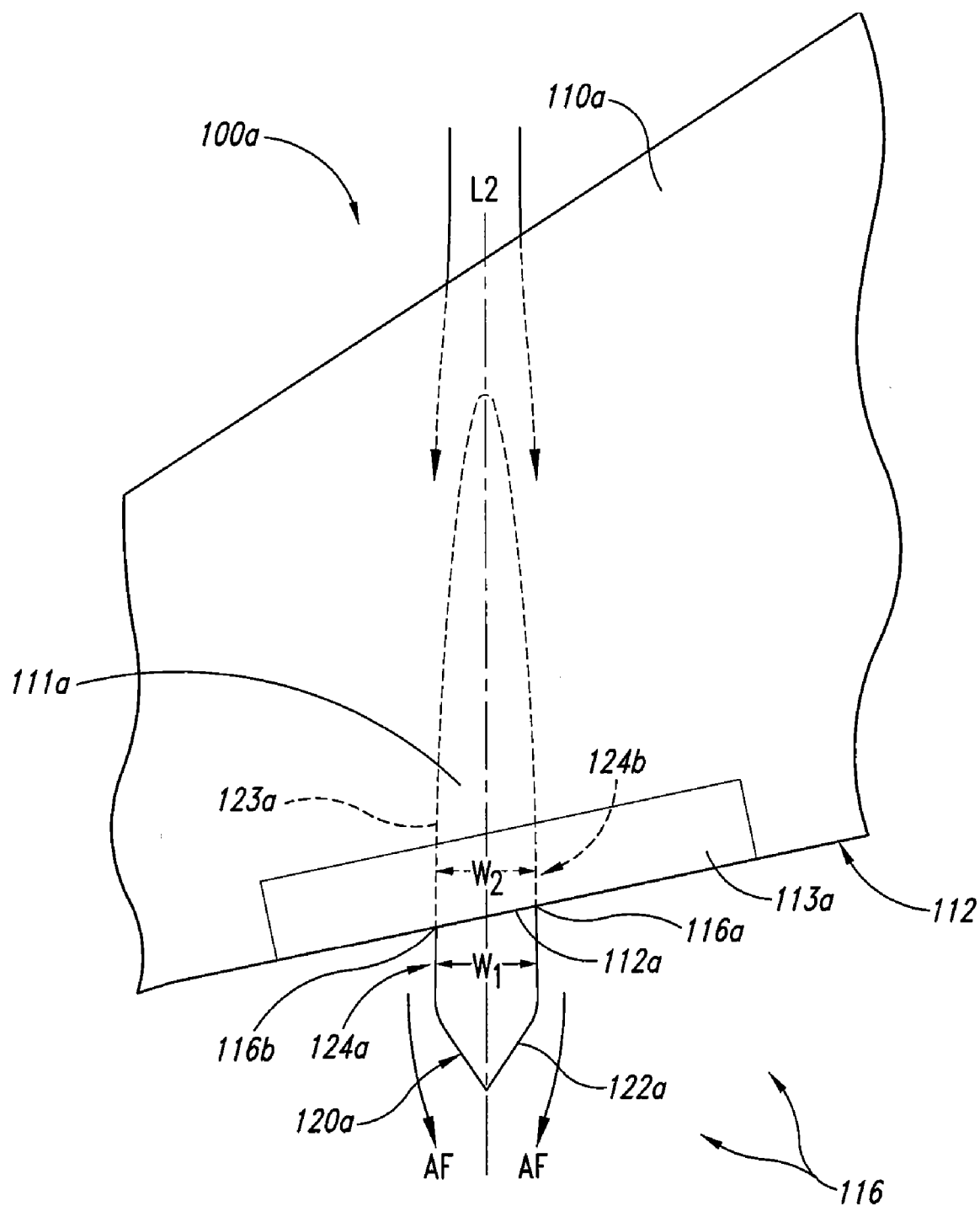
FIG. 3 is a partially schematic, enlarged view of the first fairing system shown in FIG. 2.

FIG. 3 is a partially schematic enlarged view of the first fairing system 100a shown in FIG. 2. In the illustrated embodiment, the first fairing 120a is mounted to the underside of the first airfoil 110a. For example, the first fairing section 120a can be attached to the first airfoil 110a after the first airfoil has been produced and/or fabricated onto/into the first airfoil 110a during the production process (e.g., to form a protrusion from the airfoil shape). In other embodiments, the first fairing 120a can be mounted to other portions of the first airfoil 110a. For example, the first fairing can be mounted to the top of the airfoil 110a or can be mounted to opposing surfaces of an airfoil (e.g., mounted to the left and right surfaces of a vertically oriented airfoil or to the top and bottom surfaces of a horizontally oriented airfoil). The trailing edge 112 of the first airfoil 110a can include adjacent trailing edge points 116, where the adjacent trailing edge points 116 are points on the trailing edge 112 of the first airfoil 110a immediately adjacent to the first fairing 120a. In the illustrated embodiment, two adjacent trailing edge points 116 are shown as a first adjacent trailing edge point 116a and a second adjacent trailing edge point 116b.

In the illustrated embodiment, the first fairing 120a has a first fairing section 122a that extends along the longitudinal axis L2 forward and aft of the first trailing edge portion 112a of the first airfoil section 111a. In FIG. 3, the first fairing section 122a includes the entire first fairing 120a. In other embodiments, the first fairing section 122a does not include the entire first fairing 120a.

In FIG. 3, the first fairing section 122a has a wide portion 124a that has a single spanwise planform width W1 measured perpendicular to the longitudinal axis of the first fairing 120a that is greater than or equal to a spanwise width of any other portion of the first fairing section 122a. At least part of the wide portion 124a of the first fairing section 120a can be located aft of the first airfoil section 111a and/or aft of at least one of the first and second adjacent trailing edge points 116a, 116b. For example, in the illustrated embodiment a second spanwise portion 124b of the first fairing section 122a, located forward of the first trailing edge portion 112a of the of the first airfoil section 111a and forward of the first and second adjacent trailing edge points 116a, 116b, has a width W2 that is equal to the width W1 of the wide portion 124a, but the first fairing section 122a does not have any portion with a width that is greater than the width W1 of the wide portion 124a.

It has been discovered that in certain embodiments, locating at least part of the wide portion 124a of the first fairing section 122a aft of the first airfoil section 111a and/or aft of at least one of the first and second adjacent trailing edge points 116a, 116b can affect the airflow proximate to the first fairing section 122a, resulting in a drag reduction and/or a lift increase over that of airfoils having current fairings. It is thought that one factor contributing to this phenomenon is the placement of a low pressure area proximate to the trailing edge of an airfoil. For example, when the aerospace vehicle 150 is operated in a selected configuration (e.g., with the first movable surface 113a retracted) and at certain operating conditions (e.g., at low-drag, high-speed, and/or cruise conditions), the variation in width along the longitudinal axis of the first fairing 120a can cause air (or another fluid) flowing proximate to the first fairing 120a to be accelerated as the fairing increases in width (e.g. as shown schematically by the airflow arrows AF in FIG. 3). As the airflow accelerates, the local or static pressure can decrease. By placing at least part of the wide portion 124a of the first fairing section 122a aft of the first airfoil section 111a and/or aft of at least one of the first and second adjacent trailing edge points 116a, 116b, an area of lower pressure proximate to the first fairing section 122a and the trailing edge of the first airfoil 110a can be positioned to provide a favorable pressure gradient with respect to drag and/or lift as compared to current fairings. An advantage of decreasing drag and/or increasing lift is that aircraft performance can be improved, for example, by reducing fuel burn and thereby increasing range and/or decreasing operating costs over aircraft having current fairings.

Figure 4:
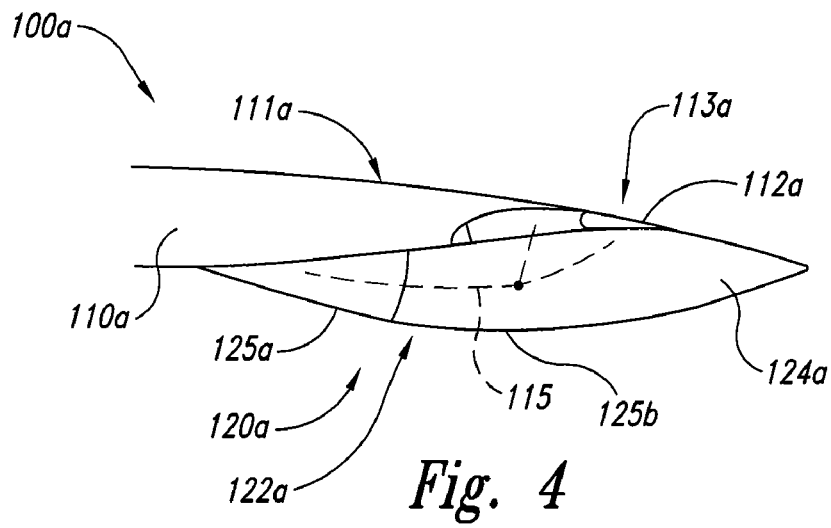
FIG. 4 is a partially schematic, cross-sectional view of the first fairing system shown in FIG. 2 taken substantially along line 4-4 with a first movable surface in a first position.
Figure 5:
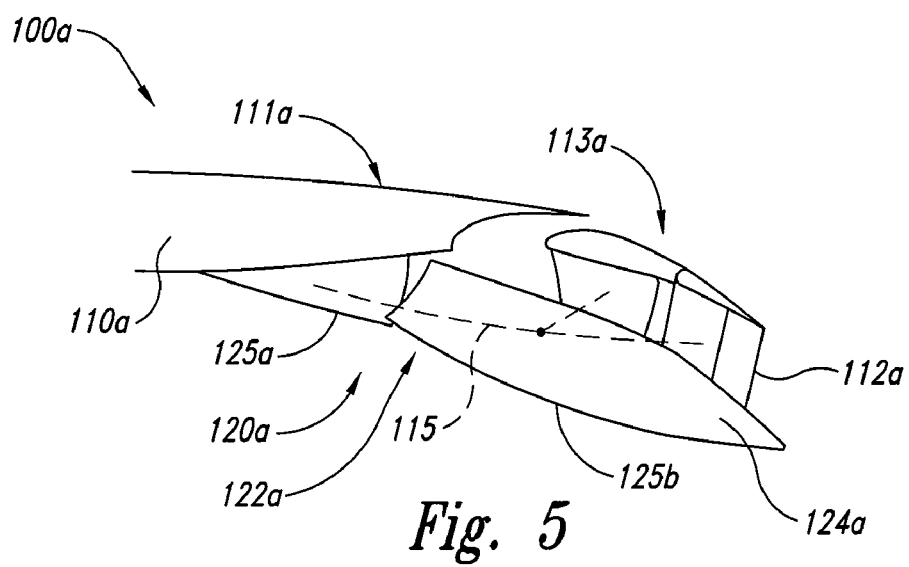
FIG. 5 is a partially schematic, cross-sectional view of the first fairing system shown in FIG. 4 with the first movable surface in a second position.
Figure 6:
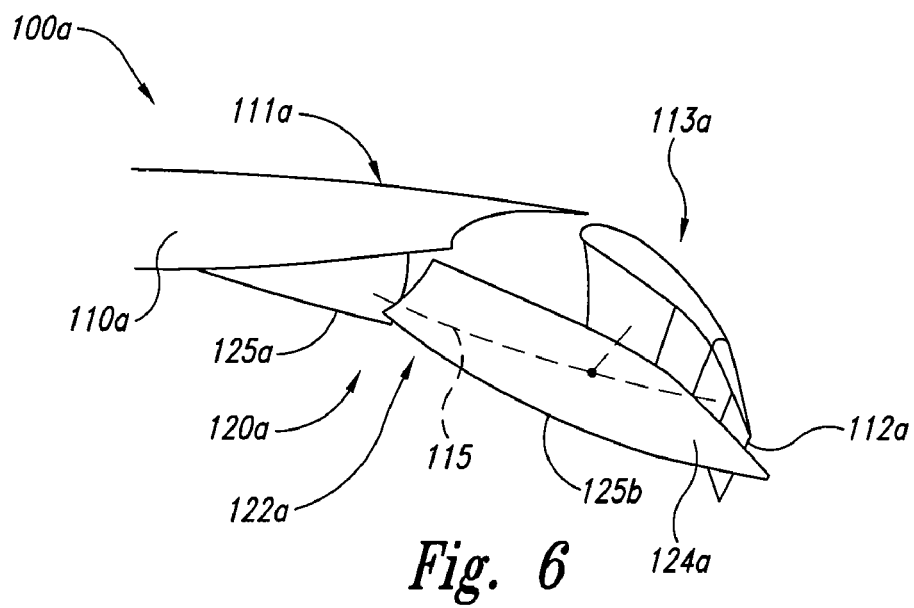
FIG. 6 is a partially schematic, cross-sectional view of the first fairing system shown in FIG. 4 with the first movable surface in a third position.

In certain embodiments, where at least part of the first trailing edge portion 112a of the airfoil section 111a is movable, the wide portion 124a of the fairing section 122a is located aft of the airfoil section 111b and/or aft of at least one of the first and second adjacent trailing edge points 116a, 116b only when the part of the first trailing edge portion 112a is in a selected position, as shown in FIGS. 4-6. FIG. 4 is a partially schematic cross-sectional view of the first fairing system 100a shown in FIG. 2 taken along line 4-4 with the first movable surface 113a in a first position. For example, the first movable surface 113a in a first position can include a flap surface in a retracted position typically used for cruise, low-drag operations, and/or high-speed operations. In the illustrated embodiment, the first position is a selected position where at least part of the wide portion 124a of the fairing section 122a is positioned aft of the airfoil section 111a and/or aft of at least one of the first and second adjacent trailing edge points 116a, 116b, as described above. In FIG. 4, the first fairing houses a drive mechanism 115 and the associated supports required to support and move the first movable surface 113a. Additionally, the first fairing 120a includes multiple pieces, shown as a first piece 125a and a second piece 125b. The first and second pieces 125a, 125b are configured to move relative to one another as the first movable surface 113a is moved.

In other embodiments, the first fairing system 100a can have other arrangements, including more or fewer pieces and/or the fairing can house other components (e.g., antennas, electronic components, and/or other aerospace vehicle system components) or no components. The first fairing 120a, however, is not a pylon. Additionally, although in the illustrated embodiment the first fairing system 100a includes a portion of a single movable surface, in other embodiments the first fairing system 100a can include portions of multiple movable surfaces (e.g., the first fairing system 100a can be positioned to include a portion of two flap surfaces). In still other embodiments, multiple fairing systems 100 can include portions of the same movable surface, for example, multiple fairing systems 100 can house multiple drive mechanisms for a single movable surface (e.g., drive mechanisms to drive a single flap surface).

FIG. 5 is a partially schematic cross-sectional view of the first fairing system 100a shown in FIG. 4 where the first movable surface 113a has been placed in a second position (e.g., a flap in a first extended position). In FIG. 6, the first movable surface 113a has been placed in a third position (e.g., a second extended position). In the illustrated embodiment, when the first movable surface 113a is in the second position (FIG. 5) or a third position (FIG. 6), the wide portion 124a of the fairing section 122a can be forward of the first trailing edge portion 112a of the first airfoil section 111a and/or forward of the first and second adjacent trailing edge points, discussed above with reference to FIG. 3. For example, the first movable surface 113a can include a flap surface that can be placed in a first extended position (FIG. 5) or a second extended position (FIG. 6) during low-speed operations where a low-drag profile can be less important than when the first movable surface 113a is in the selected position (e.g., the retracted position).

Figure 7:
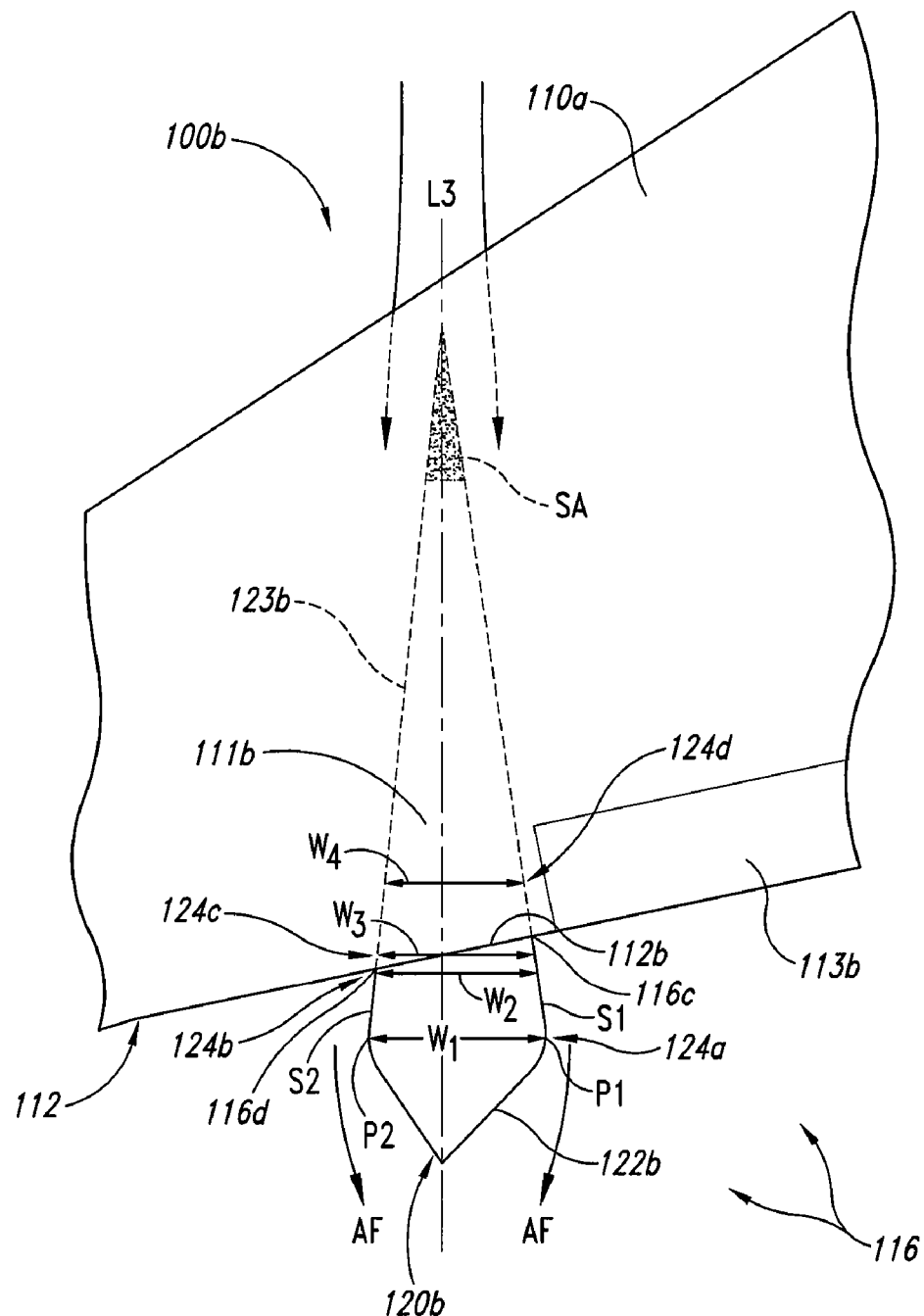
FIG. 7 is a partially schematic enlarged view of the second fairing system shown in FIG. 2.

FIG. 7 is a partially schematic enlarged view of the second fairing system 100b shown in FIG. 2. In the illustrated embodiment the second fairing 120b is mounted to the underside of the first airfoil 110a. The second fairing 120b has a second fairing section 122b that extends along the longitudinal axis L3 forward and aft of the second trailing edge portion 112b of the second airfoil section 111b. In FIG. 7, the second fairing section 122b is asymmetrical with respect to the longitudinal axis L3 of the second fairing 120b. In other embodiments, the second fairing section 122b can be symmetrical about the longitudinal axis L3 of the second fairing 120b. Additionally, in the illustrated embodiment the second fairing section 122b includes only a portion of the entire second fairing 120b (e.g., the second fairing section 122b does not include the shaded area SA of the second fairing 120b shown in FIG. 7). Additionally, in the illustrated embodiment the trailing edge 112 of the first airfoil 110a includes a third adjacent trailing edge point 116c and a fourth adjacent trailing edge point 116d that are immediately adjacent to the second fairing 120b.

In the illustrated embodiment, the second fairing section 122b includes a first side S1 and a second side S2 facing in generally lateral directions. The first and second sides S1, S2 can include the farthest points laterally from the longitudinal axis L3 of the second fairing 120b. The width of the second fairing section 122b increases in an aft direction along the longitudinal axis L3 until reaching a widest portion and then decreases. Accordingly, the second fairing section 122b includes multiple portions 124, with each portion having a single width. For example, four of the multiple portions 124 are identified in FIG. 7 as a first portion 124a having a first width W1, a second portion 124b having a second width W2, a third portion 124c having a third width W3, and a fourth portion 124d having a fourth width W4.

In FIG. 7, the fourth portion 124d is located forward of the second trailing edge portion 112b of the second airfoil section 111b and forward of the third and fourth adjacent trailing edge points 116c, 116d. The fourth portion 124d has a fourth width W4 that is smaller than the first, second, and third widths W1, W2, W3. At least part of the third portion 124c is located aft of the second airfoil section 111b (e.g., aft of the second trailing edge portion 112b) and aft of the third adjacent trailing edge point 116c. The third portion 124c has a third width W3 that is greater than the fourth width W4, but smaller than the first and second widths W1, W2. Additionally, the third portion 124c has a width that is larger than or equal to the width of any portion 124 that is forward of the third portion 124c.

The entire second portion 124b is located aft of the second airfoil section 111b and aft of the third and fourth adjacent points 116c, 116d. The second portion has a second width W2 that is greater than or equal to the width of any portion 124 that is forward of the second portion 124b. The first portion 124a is located aft of the second portion 124b and has a first width W1 that is greater than or equal to the second width W2. Accordingly, the first portion 124a is the wide portion of the second fairing section 122b. As discussed above with reference to FIG. 3, it has been discovered that in certain embodiments locating at least part of the wide portion (e.g., the first portion 124a) of the second fairing section 122b aft of the second airfoil section 111b can result in an airflow AF that produces a drag reduction and/or a lift increase over that of airfoils having current fairings.

In the illustrated embodiment, the second portion 124b also includes a first point P1 on the first side S1 and a second point P2 on the second side S2. The first and second points P1, P2 are points of maximum curvature of their respective sides S1, S2 in a streamwise direction (e.g., with respect to the airflow AF and/or with respect to the longitudinal axis L3 of the second fairing 120b). In FIG. 7, the wide portion (e.g., the first portion 124a) includes the first and second points P1, P2, and the first and second points P1, P2 are opposite one another relative to the longitudinal axis L3 of the second fairing 120b. In other embodiments, the points of maximum curvature on the first and second sides S1, S2 are not coincidental with the wide portion (e.g., the first portion 124a) of the second fairing 120b. In still other embodiments, the points of maximum curvature on the first and second sides are not directly opposite one another relative to the longitudinal axis L3 of the second fairing 120b (e.g., the points of maximum curvature are on their respective sides, but are not directly opposite one another). In yet other embodiments, only the point of maximum curvature for one of the sides of the second fairing section 122b is located aft of the second airfoil section 111b and/or aft of at least one of the third and fourth adjacent trailing edge points 116a, 116b. As discussed above with reference to FIGS. 3-6, in certain embodiments at least a part of the second trailing edge portion 112b of the second airfoil section 111b is movable to at least two positions and at least one point of maximum curvature is located aft of the second airfoil section 111b and/or aft of at least one of the third and fourth adjacent trailing edge points 116a, 116b when the movable part of the second trailing edge portion 112b is in a selected position (e.g., one of the two positions). In still other embodiments, a side of the second fairing section 122b can have multiple points with the maximum curvature (e.g., the second fairing section 122b can have two points on a side that have the same curvature where that curvature is the maximum curvature on the respective side).

It has been discovered that in certain embodiments locating a point of maximum curvature of at least one of the first or second sides S1, S2 of the second fairing section 122b aft of the second airfoil section 111b can affect the airflow AF proximate to the second fairing section 122b. This can result in a drag reduction and/or a lift increase over that of airfoils having current fairings. It is thought that one factor contributing to this phenomenon is the placement of a low-pressure area proximate to the trailing edge of the airfoil and the fairing. For example, the airflow AF tends to accelerate proximate to the point(s) of maximum curvature, thereby reducing the local or static pressure. This reduction in pressure can decrease drag and/or increase lift over that of aircraft with current fairings. An advantage of decreasing drag and/or increasing lift is that aircraft performance can be improved, reducing fuel burn, and thereby increasing range and/or decreasing operating costs over aircraft having current fairings.

In still other embodiments, it has been discovered that the spanwise and streamwise lift distribution of an airfoil having a fixed geometry can be adjusted or manipulated by changing the location of the points of maximum curvature of two or more fairings relative to a trailing edge of the airfoil. As discussed in greater detail below, such arrangements can also result in less drag and/or increased lift as compared with aircraft including conventional fairing system configurations. Furthermore, making such adjustments to a particular aircraft's fairing configuration can provide additional reductions in drag for the aircraft beyond what can be achieved with advanced wing design alone.

Figure 8:
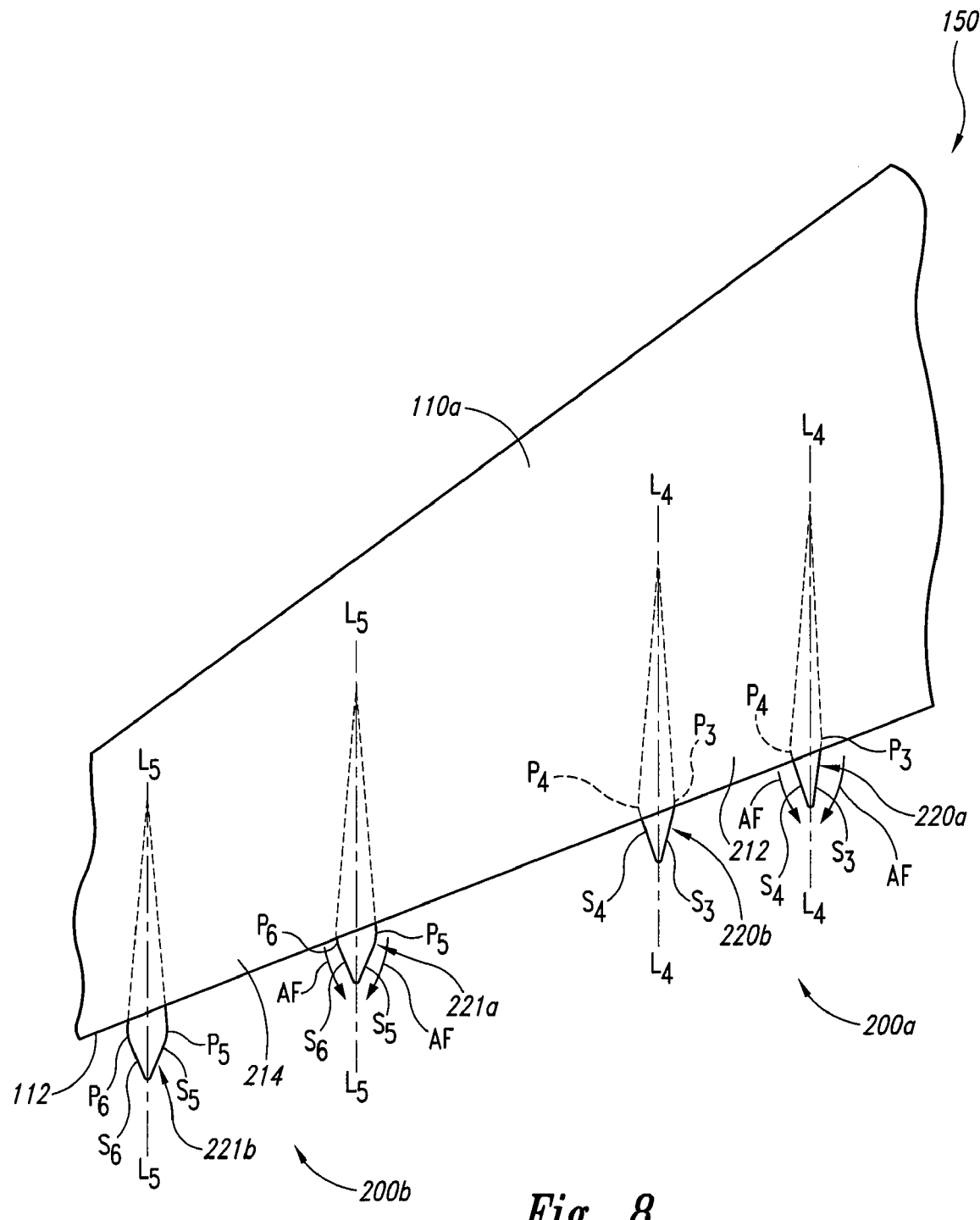
FIG. 8 is a partially schematic illustration of a portion of a lifting surface including a first fairing system and a second fairing system configured in accordance with another embodiment of the invention.

FIG. 8, for example, is a partially schematic illustration of a portion of the aerospace vehicle 150 including a first fairing system 200a and a second fairing system 200b configured in accordance with an embodiment of the invention. The first fairing system 200a includes one or more first fairings 220 (two are shown as first fairings 220a and 220b) mounted to the underside of the first airfoil 110a at a first, inboard portion 212 of the airfoil 110a. The first fairings 220a and 220b have a longitudinal axis L4 that is at least approximately parallel to the longitudinal axis L1 (FIG. 2) of the aerospace vehicle 150. The first fairings 220a and 220b each include a first side S3 and a second side S4 on opposite sides of the longitudinal axis L4 and facing in generally opposite directions. The individual first fairings 220a and 220b also include a first point P3 on the first side S3 and a second point P4 on the second side S4. The first and second points P3 and P4 are points of maximum curvature of their respective sides S3 and S4 in a streamwise direction (i.e., with respect to the airflow AF and/or with respect to the longitudinal axis L4 of the first fairings 220a and 220b). In the embodiment illustrated in FIG. 8, the points of maximum curvature P3 and P4 on each first fairing 220a and 220b are at least approximately forward of the trailing edge 112 of the first airfoil 110a.

The second fairing system 200b includes one or more second fairings 221 (two are shown as second fairings 221a and 221b) mounted to the underside of the first airfoil 110a at a second, outboard portion 214 of the airfoil 110a. The second fairings 221a and 221b can be generally similar to the first fairings 220a and 220b described above. For example, the second fairings 221a and 221b have a longitudinal axis L5 that is at least approximately parallel to the longitudinal axis L1 (FIG. 2) of the aerospace vehicle 150. Furthermore, the second fairings 221a and 221b each include a first side S5 having a first point P5 and a second side S6 having a second point P6 on opposite sides of the longitudinal axis L5 and facing in generally opposite directions. The first and second points P5 and P6 are points of maximum curvature of their respective sides S5 and S6 in a streamwise direction. In contrast with the arrangement of the first fairings 220a and 220b, the points of maximum curvature P5 and P6 on the second fairings 221a and 221b are positioned at least approximately aft of the trailing edge 112 of the airfoil 110a.

As mentioned previously, it has been discovered that adjusting the location of the points of maximum curvature on two or more fairings relative to the trailing edge of the airfoil carrying the fairings can affect the spanwise lift distribution. For example, positioning the point of maximum curvature of one or more inboard fairings (e.g., first fairings 220a and 220b) at least approximately forward of the airfoil's trailing edge 112 generally results in a lower local lift coefficient at the inboard portion 212 of the airfoil 110a as compared with other portions of the airfoil 110a. Conversely, positioning the point of maximum curvature of one or more outboard fairings (e.g., second fairings 221a and 221b) at least approximately aft of the airfoil's trailing edge 112 generally results in a higher local lift coefficient at the outboard portion 214 of the airfoil 110a as compared with other portions of the airfoil 110a. Accordingly, the spanwise lift distribution of the airfoil 110a can be made more elliptical, which in turn can result in less drag.

In the embodiment illustrated in FIG. 8, the points of maximum curvature P3 and P4 of the first fairings 220a and 220b are each at least approximately forward of the trailing edge 112, while the points of maximum curvature P5 and P6 of the second fairings 221a and 221b are each at least approximately aft of the trailing edge 112. In other embodiments, however, only the point of maximum curvature P3 or P4 for one of the sides of the first fairings 220a-b may be forward of the trailing edge 112. Likewise, only the point of maximum curvature P5 or P6 for one of the sides of the second fairings 221a-b may be aft of the trailing edge 112. A wide variety of different configurations and/or arrangements are possible for the first and second fairing systems 200a and 200b. Furthermore, in at least some embodiments, optimization techniques can be used to adjust the position of the fairings systems 200a and/or 200b on the airfoil to optimize the lift distribution of the airfoil for a particular set of parameters (e.g., operating conditions, aircraft configuration, etc.)

Figure 9:
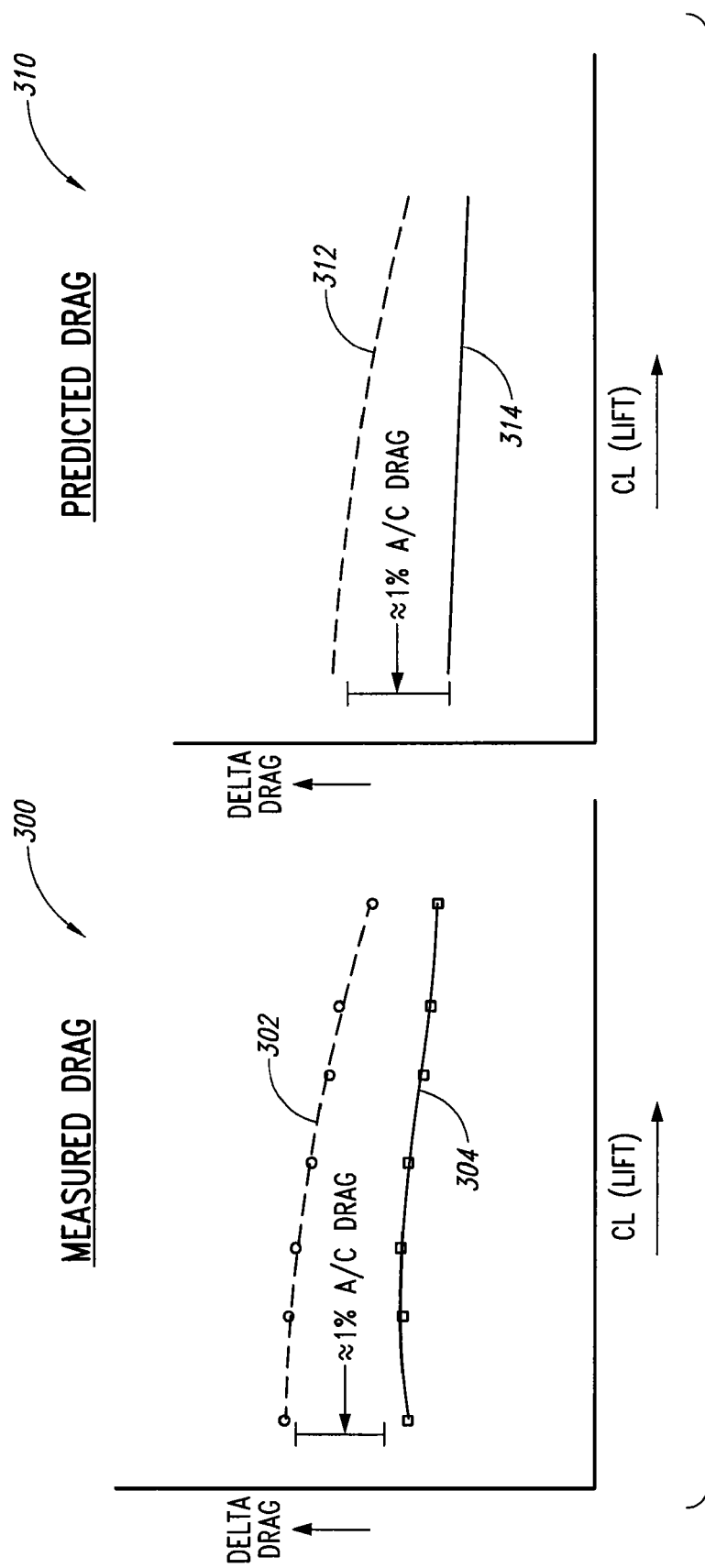
FIG. 9 is an illustration of a measured drag chart and a predicted drag chart of an aircraft both with and without the fairing system configuration of FIG. 8.

FIG. 9, for example, includes charts showing measured and predicted drag reduction for an aircraft with conventional fairing systems as compared to the aircraft with the first and second fairing systems 200a and 200b of FIG. 8. More specifically, a first chart 300 illustrates measured drag for an aircraft with conventional fairing systems (shown as line 302) versus the same aircraft having the first and second fairing systems 200a and 200b installed (shown as line 304). The second chart 310 illustrates predicted drag for the same two aircraft configurations-the aircraft with conventional fairing systems (shown as line 312) versus the aircraft with the first and second fairing systems 200a and 200b installed (shown as line 314). As shown by the first and second charts 300 and 310, the incorporation of the fairing systems 200a and 200b can result in about a 1% reduction in total drag for the aircraft. As mentioned above, decreasing drag can reduce fuel burn and, accordingly, increase range and/or decrease operating costs as compared with aircraft having conventional fairing configurations.

Referring back to FIG. 8, the first and second fairing systems 200a and 200b are not pylons. Rather, the first and second fairing systems 200a and 200b can be used to house components generally similar to the fairing systems 100a and 100b described above with respect to FIGS. 2-7. In other embodiments, however, the first and second fairing systems 200a and 200b may not house any components. In still other embodiments, the first and/or second fairing systems 200a and 200b can include more or fewer features and/or be arranged differently relative to each other or the airfoil 110a.

Figure 10:
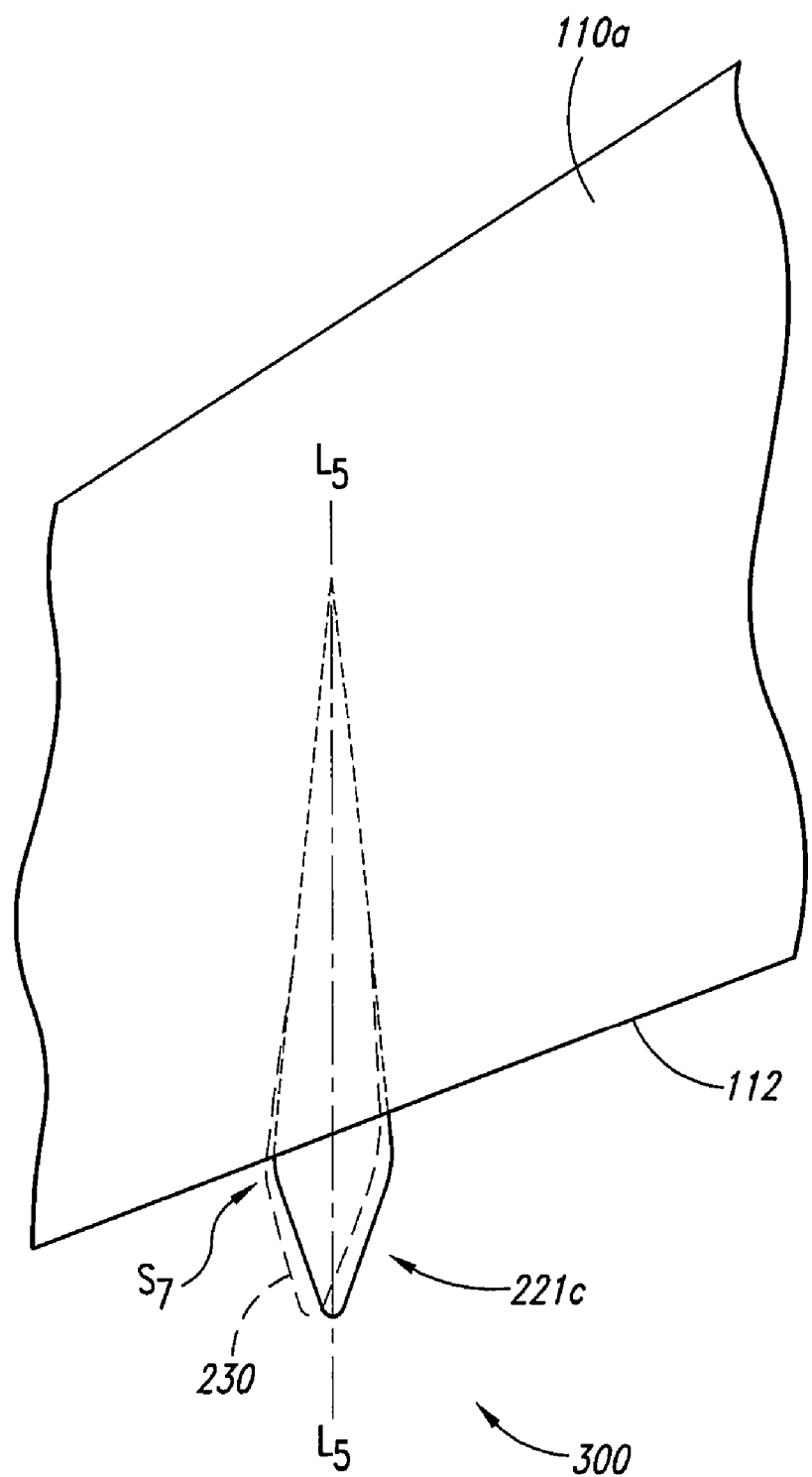
FIG. 10 is a partially schematic illustration of a fairing system configured in accordance with still another embodiment of the invention.

FIG. 10 is a partially schematic illustration of a fairing system 300 configured in accordance with still another embodiment of the invention. The fairing system 300 includes one or more fairings 221c (only one is shown) mounted to the underside of the first airfoil 110a. The fairing 221c can be generally similar to the fairings 220a-b or 221a-b described above with reference to FIG. 8. The fairing 221c differs from the fairings 220a-b and 221a-b described above, however, in that camber has been applied to an aft fairing section 230 (shown in broken lines) of the fairing 221c. More specifically, the aft fairing section 230 of the fairing 221c has additional camber applied to an outboard side S7 of the fairing 221c. The camber can be applied to the fairing to further adjust the local lift coefficient at that particular portion of the airfoil 110a. In this particular case, for example, additional lift is generated outboard of the fairing as a result of the larger curvature (i.e., camber) on the outboard side S7 of the fairing 221c. It has been discovered that the aerodynamic effects of such a configuration can be substantial and, in some cases, can result in further drag reduction. Although only a single fairing 221c is shown, it will be appreciated that camber can be applied to one or more fairings, and that camber can vary from fairing to fairing depending on the desired lift profile.

Figure 1:
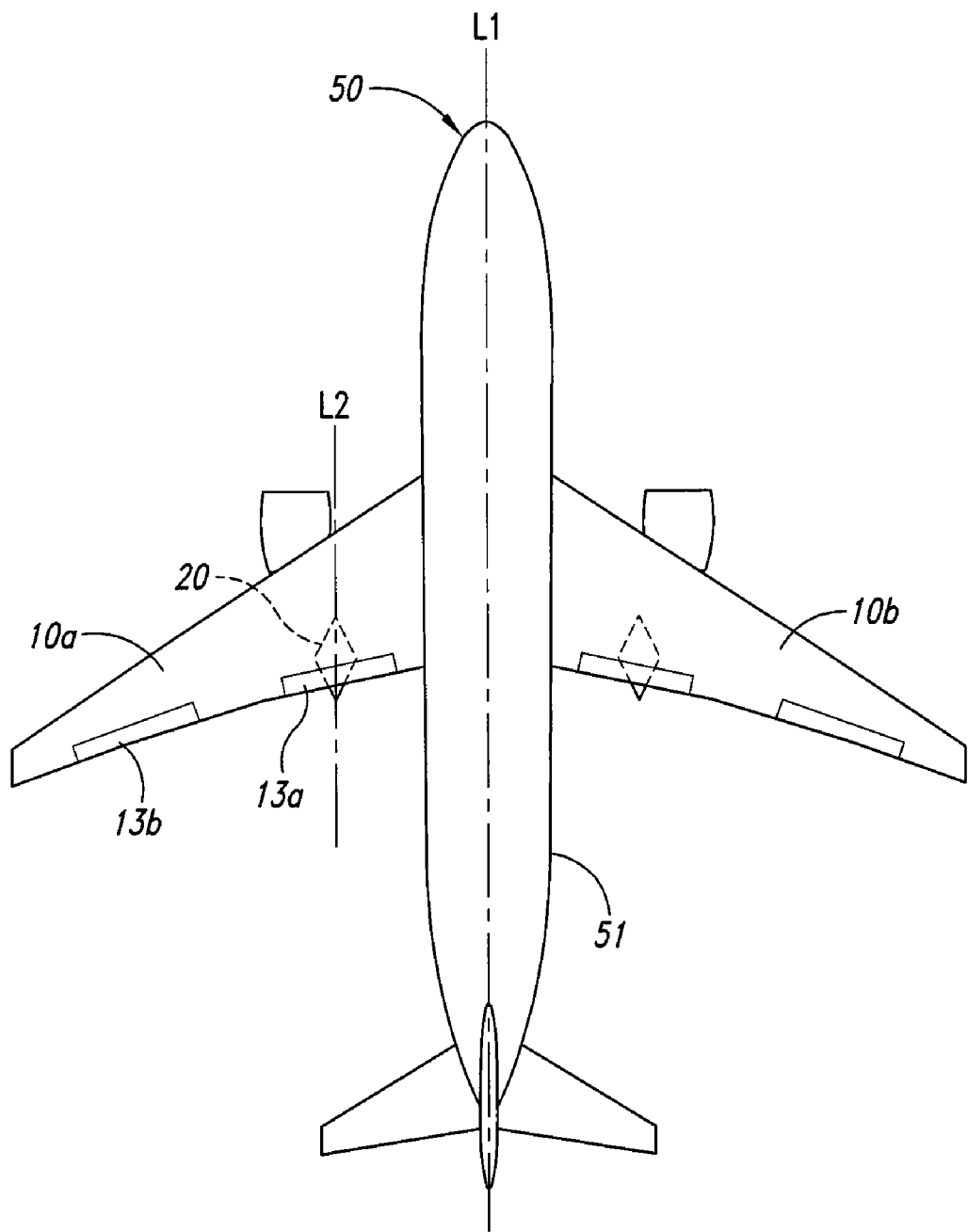
FIG. 1 is a partially schematic illustration of an aircraft with a flap fairing in accordance with the prior art.

In certain embodiments, fairing systems 100/200/300 in accordance with aspects of the present invention can be retrofitted on existing aircraft. For example, in selected embodiments the fairing 20 (shown in FIG. 1) mounted on the first airfoil 10a of the aircraft 50 can be removed and a fairing similar to the fairing systems 100/200/300 described above with reference to FIGS. 2-10 can be mounted to the first airfoil 10a of the aircraft 50 shown in FIG. 1. As discussed above, in certain embodiments the drag of the aircraft 50 can be reduced and/or the lift of the aircraft 50 can be increased by replacing the fairing 20 (shown in FIG. 1) with a fairing system 100 in accordance with aspects of the invention.

From the foregoing, it will be appreciated that specific embodiments of the invention have been described herein for purposes of illustration, but that various modifications may be made without deviating from the invention. Additionally, aspects of the invention described in the context of particular embodiments may be combined or eliminated in other embodiments. For example, although aspects of the present invention have been described above with reference to a wing of an aerospace vehicle, in other embodiments fairing systems in accordance with aspects of the invention can include other airfoil surfaces (e.g., a vertical stabilizer or a canard). Although advantages associated with certain embodiments of the invention have been described in the context of those embodiments, other embodiments may also exhibit such advantages. Additionally, not all embodiments need necessarily exhibit such advantages to fall within the scope of the invention. Accordingly, the invention is not limited except as by the appended claims.

I claim:

1. A method for manufacturing a wing, the method comprising:
   locating a first fairing and a second fairing proximate to the wing, the individual fairings including a first side and a second side laterally displaced from a longitudinal axis, wherein the first and second fairings each house (a) at least a portion of a drive mechanism configured to move one or more movable surfaces of the wing, (b) at least a portion of one or more supports associated with the corresponding movable surface, or (c) both (a) and (b);
   mounting the first fairing to the wing with a point of maximum curvature for at least one of a first side and a second side of the first fairing located approximately forward of a trailing edge of the wing; and
   mounting the second fairing to the wing outboard of the first fairing and with a point of maximum curvature for at least one of a first side and a second side of the second fairing located approximately aft of the trailing edge of the wing.

2. The method of claim 1 wherein:
   mounting the first fairing to the wing comprises mounting the first fairing with both the point of maximum curvature of the first side and the point of maximum curvature of the second side of the first fairing located forward of the trailing edge; and
   mounting the second fairing to the wing comprises mounting the second fairing with both the point of maximum curvature of the first side and the point of maximum curvature of the second side of the second fairing located aft of the trailing edge.

3. The method of claim 1 wherein:
   mounting the first fairing to the wing includes mounting a first flap fairing to a wing having a movable flap surface, the first flap fairing housing at least a portion of a drive mechanism for the flap surface, the wing being coupled to a fuselage of an aircraft; and
   mounting the second fairing to the wing includes mounting a second flap fairing to the wing and movable flap surface, the second flap fairing housing at least a portion of the drive mechanism for the flap surface.

4. The method of claim 1 wherein at least a portion of the first fairing and the second fairing are configured to move when the corresponding drive mechanism moves the one or more movable surfaces.

5. The method of claim 1 wherein mounting a first fairing and a second fairing to the wing comprises mounting the first and second fairings to a wing that is couplable to an aerospace vehicle.

* * * * *